Dec. 22, 1970  W. R. SPENCE  3,548,420
CUSHION STRUCTURE

Filed March 6, 1967  2 Sheets-Sheet 1

INVENTOR.
WAYMAN R. SPENCE
BY
Woodhams, Blanchard & Flynn
ATTORNEYS

Dec. 22, 1970 W. R. SPENCE 3,548,420
CUSHION STRUCTURE
Filed March 6, 1967 2 Sheets-Sheet 2
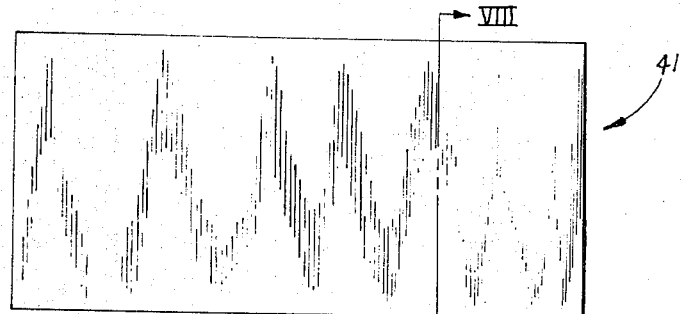
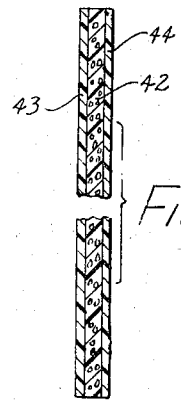
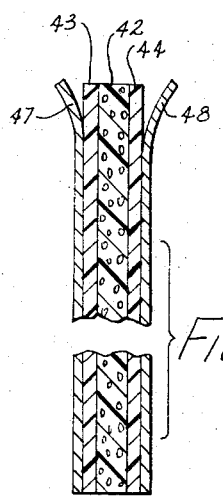
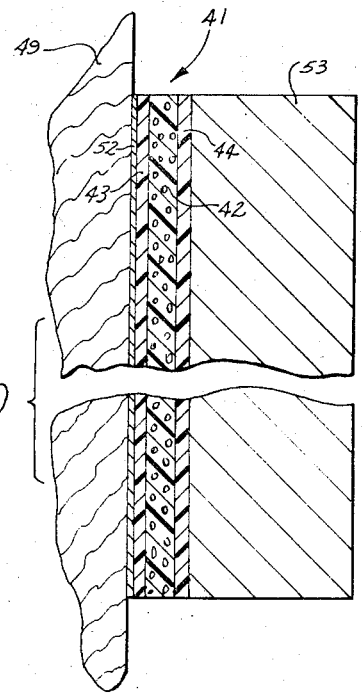
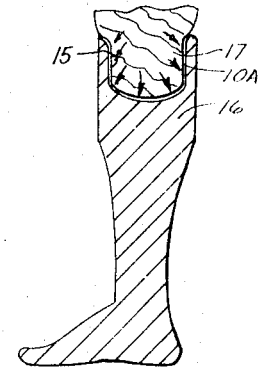
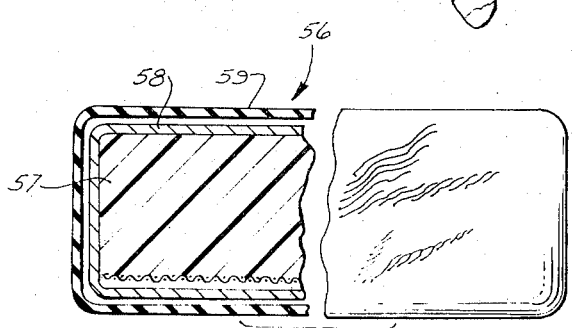
INVENTOR.
WAYMAN R. SPENCE
BY
Woodhams, Blanchard & Flynn
ATTORNEYS United States Patent Office 3,548,420
Patented Dec. 22, 1970

3,548,420
CUSHION STRUCTURE
Wayman R. Spence, Salt Lake City, Utah, assignor to Stryker Corporation, Kalamazoo, Mich., a corporation of Michigan
Continuation-in-part of application Ser. No. 515,525, Dec. 22, 1965. This application Mar. 6, 1967, Ser. No. 621,056
The portion of the term of the patent subsequent to Mar. 14, 1984, has been disclaimed
Int. Cl. A61f 1/02, 13/06
U.S. Cl. 3—20                                16 Claims

ABSTRACT OF THE DISCLOSURE

The cushion structure comprises a gel-like substance, such as an organosiloxane gel comprising the reaction product of an organosiloxane and a hydrogenosiloxane which is preferably a copolymer of a particular combination of siloxanes combined with an additive such as dimethylpolysiloxane. The gel is covered, at least on one side, by sheet material which may be cloth, rubber, leather, foamed plastic or paper, depending upon the particular use. The cushion structure is used to at least reduce pressure necrosis in footwear, prosthesis for the upper and lower extremities, corrective braces, plaster casts and the like.

---

This application is a continuation-in-part of my patent application Ser. No. 515,525, filed Dec. 22, 1965, for a "Cushion Structure," now Pat. No. 3,308,491. In the course of developing and adapting the cushion structure of the parent application to various uses related to patient therapy and treatment, I found that many problems were greatly reduced, but not completely eliminnated, by the original design of the cushion structure, which was directed primarily, but not entirely, to the relief of necrosis due to concentrations of weight on pressure points produced by bones located close to the surface of the skin. However, it is well known in the medical profession that necrosis producing substantially the same discomforts can result from pressures produced by prosthetic devices, particularly for the upper and lower extermites, by corrective applications, such as the Milwaukee Brace, and by plaster casts, especially if the patient is ambulatory. Other similar and related conditions develop the same type of pressure necrosis problems.

In addition to the foregoing, there are special weight-producing pressure necrosis conditions, such as those encountered by people having particular foot gear problems which require special adaptation of my cushion structure. Almost all of these special problems have certain common factors which, when understood, render these problems capable of solution by variations in my cushion structure. A principal factor was the need for maintaining the gel in a relatively thin layer so that the cushion could fit into a relatively narrow space and, further, confining the gel against migration under conditions of substantially continuous and relatively high pressure. Yet, on the other hand, where shearing forces tend to develop due the shifting in the position of the patient's body with respect to the pressure creating device, the material confining the gel must be capable of allowing the gel to effect the lateral movement which avoids the necrosis which usually occurs with conventional pads for substantially the same purpose. In other words, the containing material must be capable of holding the gel in a selected position to minimize necrosis and soreness due to excessive pressure without creating necrosis due to the creation of prohibitive shearing forces parallel with the engaged surface of the patient.

It was found that even small amounts of lateral movement provided by the cushion could greatly reduce necrosis due to shearing forces so that the gel could be used in combination with layers of fabric or foamed plastic, for example, which would serve to contain the gel within a selected, desired region.

Under some circumstances, particularly with ambulatory patients, severe pressure conditions exist or occur on a periodic repetitive basis. For example, particular problems may arise wherein the feet may be sensitive in localized areas to the support of weight, such as the metatarsal region, and are not sensitive when no weight is placed upon such spots. Yet, due to the normal buildup of protective calluses on the bottom of the foot, necrosis due to shearing motions are not a problem. However, due to the excessive weight concentrated on such sensitive spots, migration of the gel becomes a far more serious problem. Thus, the containing material must be capable of applying sufficient pressure in its uncompressed condition (due to the weight of the human) to tend to move the gel into a preselected position following each pressure application produced by walking, for example. This type of problem also occurs at the distal end of a stump where it is engaged by a prosthetic device and in other similar circumstances.

Accordingly, a primary object of this invention has been the provision of a cushion structure for protecting the body of a human or animal against localized pressures directed against the surface of the body and usually capable of developing pressure necrosis before such pressure can be relieved.

A further object of this invention has been the provision of a cushion structure, as aforesaid, which is hypoallergenic, stable over a relatively wide temperature range, which will not support the growth of algae and/or bacteria, which is relatively easy to handle and maintain, which has good properties of moisture and thermal resistance, and which includes a soft, nonfriable and jelly-like material capable of absorbing relatively large shearing forces without fracturing.

A further object of this invention has been the provision of a cushion structure, as aforesaid, which can be used effectively in zones where normal relatively thin padding has heretofore been used while, at the same time, performing the aforesaid protection.

Other objects and purposes of this invention will become apparent to persons familiar with this type of structure upon reading the following descriptive material and examining the accompanying drawings, in which:

FIG. 7 is a plan view of a further alternate cushion structure.

FIG. 8 is an enlarged, broken, sectional view taken along the line VIII—VIII in FIG. 7.

FIG. 9 is an enlarged broken, sectional view similar to that appearing in FIG. 8 and including protective cover sheets on the opposite sides thereof.

FIG. 10 is a broken, cross-sectional view of the cushion structure of FIG. 8 disposed between the outer surface of a human body and a plaster cast.

FIG. 11 is a broken, partially sectioned view of a cushion structure having a special covering.

FIG. 13 illustrates a cushion structure adapted for use with a prosthetic device.

Figure 1:
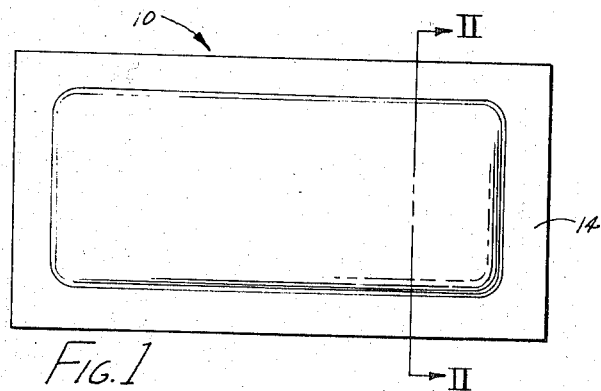
FIG. 1 is a plan view of a cushion structure embodying the invention.
Figure 3:
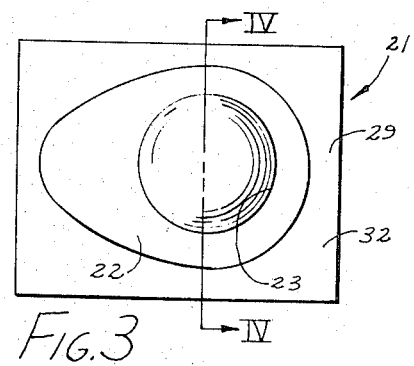
FIG. 3 is a plan view of an alternate cushion structure embodying the invention and having an adhesive-covered with a protective sheet.
Figure 6:
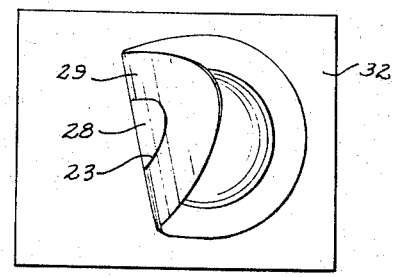
FIG. 6 is a plan view of the alternate cushion of FIG. 3 with the protective sheet partially removed therefrom.
Figure 5:
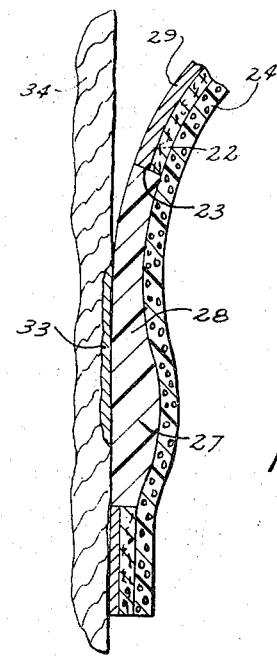
FIG. 5 is a sectional view similar to that appearing in FIG. 4 and showing the cushion structure partially applied to the body surface of a human.

For convenience in description, the terms "top," "bottom" and words of similar import will have reference to the front and rear sides, respectively, of the cushion structures appearing in FIGS. 1, 3 and 7, for example. The terms "inner," "outer" and derivatives thereof will have reference to the geometric center of said cushion structures and parts thereof.

DETAILED DESCRIPTION

Figure 2:
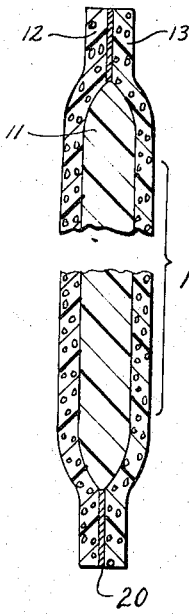
FIG. 2 is an enlarged, broken, sectional view taken along the line II—II in FIG. 1.

As shown in FIGS. 1 and 2, which illustrate one embodiment of the invention, the cushion structure 10 is comprised of a relatively flat and thin, self-contained, semisolid core 11 and a pair of resiliently, flexible sheets 12 and 13 disposed on opposite sides of said core. Although the cushion structure 10 (FIG. 1) is shown as being substantially rectangular in outside shape, it could be otherwise if so desired. The core 11 is preferably made from an organosiloxane gel, substantially of the type disclosed and described in Pat. No. 3,020,260. Thus, said core will have a soft, slightly tacky, nonfriable and jelly-like consistency in its cured condition. Specific reference is made herein to the use of a gel and, more specifically, to those gels known as organosiloxane gels, because this particular material has been found especially suited to the purposes of the invention. However, it may be found that other gels and/or colloids, including jelly-like substances which, strictly speaking, are not colloids, can serve satisfactorily in carrying out the purposes of the invention.

The core 11 is preferably covered by a pair of elastic, flexible sheets 12 and 13 which may be fabricated from a foamed material such as polyurethane or from any other elastic, flexible material. Although such material should be of a type that is reasonably soft and resilient, it should also to a certain degree resist stretching. Sheets 12 and 13 may be secured together wherever they are in contact with each other, as distinguished from in contact with core 11, by an adhesive material 20 such as, for example, zinc oxide. As shown in FIG. 1, the zone of engagement occurs along the entire periphery 14 of the cushion structure 10.

The particular embodiment of the cushion structure 10 described is especially suitable for use with corrective appliances, such as the Milwaukee Brace. In such an application the cushion 10 may be disposed between the appliance and the patient's body in all areas where pressure is apt to exist.

A cushion structure 10A (FIG. 13) of the same general construction as cushion 10, is also ideally suited for use in the cup 15 of a prosthetic device 16 which receives the distal end of a stump 17. Thus, the weight or pressure of the body is caused to be equally distributed over a much greater area including the side walls of the cup 15. The cushion 10A is also advantageously cup shaped. The cushion structures 10 and 10A may be provided in any size and shape needed in the particular application, for example, cushion structure 10A might be frusto-conical in shape for use in conjunction with the prosthetic device 16.

ALTERNATE STRUCTURES

Figure 4:
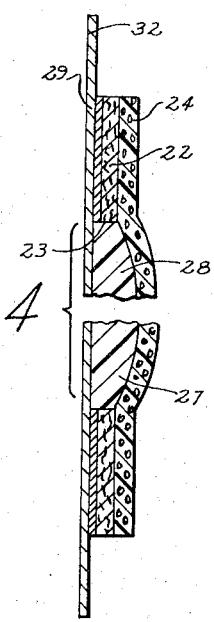
FIG. 4 is an enlarged, broken, sectional view taken along the line IV—IV in FIG. 3.
Figure 12:
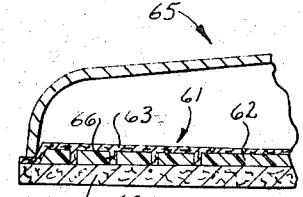
FIG. 12 is a fragmentary sectional view of the toe of a shoe having an insole structure including a cushion according to the invention.

The cushion structure 21, appearing in FIG. 3, is comprised of a flat and thin base structure 22 which may be made of moleskin having a central opening 23 therein. A layer of foamed material 24 (FIG. 4), such as polyurethane foam, may be bonded to the top surface of the moleskin 22 so that it covers the hole 23. The hole 23 in the moleskin 22 is filled with a core 28 of gel which bears against the foamed layer 24. The core 28 of cushion structure 21 may be of substantially the same material as the core 11 of cushion structure 10.

An adhesive material 29 (FIG. 4), such as zinc oxide, is provided on the lower surface of the moleksin 22. Said adhesive layer 29 may be used to secure the cushion structure 21 to a protective crinoline layer 32 (FIG. 4) during storage and until the cushion structure 21 is to be used, at which time said crinoline layer 32 is removed. Core 28 may then be placed in direct contact with the sensitive area 33 which may be a bruise, sore, or corn, for example. The adhesive layer 29 comes into contact with the patient's flesh 34 around the sensitive area, thereby securing the cushion structure 21 in place.

The laminated cushion structure 41 (FIGS. 7 and 8) is well adapted for use under a plaster cast 53. Cushion structure 41 has a central member 42 which is comprised of a porous material, such as a sheet of foamed polyurethane or a fibrous fabric, which is impregnated with a gel, such as the gel 11 in cushion 10. The gel is applied to the central member so as to form layers 43 and 44 of gel disposed on either side of the central member 42. Although the cushion structure 41 is illustrated in a rectangular shape, it may be provided in various shapes including long strips which, for example, may be rolled up on a spool. A pair of protective sheets 47 and 48 of material such as paper may be provided adjacent the layers 43 and 44, respectively, thereby preventing damage to or contamination of said layers during handling. Immediately, prior to use, the paper sheets 47 and 48 are removed from the cushion structure 41. It is known that casts are often located in regions where the adjacent surface 49 of the patient's body can move excessively with respect to the cast in a direction parallel with the surface 49. However, under normal conditions, the cast will often be urged strongly against such surface. The gel layers 43 and 44 may have a slightly tacky texture which would normally cause them to stick to the surface 49 and the cast 53, which would be undesirable in regions where said excessive movement occurs. Thus, to provide for pressure protection and excessive lateral movement, a layer of lubricant 52, such as talc, is placed between the surface 49 of the patient and cushion structure 41 before the plaster cast 53 is applied to the patient over the cushion structure 41.

The cushion structure 56 may be provided in the form of a flotation seat pad having a core 57 consisting of a gel which may be of the same type used in the core 11. Although the gel of core 11 is of such thickness that it is normally capable of maintaining its own continuity, the type of use to which it is exposed necessitates some form of container. For this purpose, the core 57 is placed in a resiliently flexible envelope 58 which may be made from a stockinette material. The combined core 57 and envelope 58 are then preferably inserted into a waterproof casing which may be a pure latex rubber cover 59. The rubber cover 59 tends to strengthen the flotation seat pad 56 and reduce the possibility of fractures in the gel core 57 without restricting materially the capability of the pad to absorb pressures and minimize shearing forces.

An alternate cushion structure 61 may be provided as a metatarsal or foot pad comprised of a core 62 which can be disposed between layers 63 and 64 of leather or the like. Due to the very substantial weight that must be supported by the metatarsal region or other areas of the foot, it may be desirable to isolate these areas by using a plurality of partitions 66 between the layers 63 and 64. Metatarsal pad 61 may be either removably inserted into a shoe 65 or included as part of the shoe construction itself by being permanently secured therein.

The gel portions or cores 11, 28, 43, 44, 56 and 62 are preferably made from the reaction product of an intimate mixture consisting essentially of (1) an organosiloxane having a viscosity of from 100 to 10,000 centistokes at 25° C. and being a copolymer consisting essentially of units of the formula $RViSiO$, $R_2SiO$ and $CH_3R_2SiO_{.5}$ where each R individually is selected from the group consisting of methyl and phenyl radicals and Vi represents a vinyl radical, at least 0.174 molar percent of the units in said copolymer being the said RViSiO units, (2) a liquid hydrogenosiloxane of the average general formula $HRCH_3SiO(R_2SiO)_nSiCH_3RH$ where each R is as above defined and $n$ has an average value such that the viscosity of the hydrogenosiloxane is no more than 10,000 cs. at 25° C., no more than 25 molar percent of the total R radicals present in (1) and (2) being phenyl, and (3) a platinum catalyst in an amount sufficient to furnish at least 0.1 part per million of Pt based on the combined weight of (1) and (2); the proportions of (1) and (2) being such that prior to reaction there is an average of from 1.4 to 1.8 gram atoms of the silicon-bonded H atoms in (2) per gram molecular weight of (1) and there being at least one RViSiO unit in (1) for every silicon-bonded H atom in (2), the molecular weight of (1) being calculated by the equation:

$$\log visc. = 1.00 + 0.0123 \, M^{.5}$$

where M is the molecular weight and "visc." is the viscosity of (1) in cs. at 25° C.

While the gel portions 11, 28, 43, 44, 52, and 62 may be made of a pure reaction product as described in the preceding paragraph, it has been found desirable to incorporate a substantial quantity of a filler or extender material in the reaction product in order to minimize cost. It has been found especially satisfactory to use a filler consisting essentially of dimethyl polysiloxane fluid which can be uniformly mixed in the reaction mixture before the reaction begins. The dimethyl polysiloxane fluid may be of viscosity of about 1,000 cs. at 25° C. It has been found quite desirable to use about 25 percent by weight of the filler material, but up to 50 percent by weight can be used for some applications.

The embodiments of the invention in which an exclusive property or privilege is claimed are defined as follows:

1. A cushion structure for protecting a mammal body against the application on the body of injurious localized pressures, comprising:
   a one-piece cushion made of an elastic, nonfriable, nonporous, semisolid gel of a synthetic organic material, said gel having a hydrostatic property so that it is capable of easily flowing laterally under pressure, said gel being capable of returning toward its original shape as a result of its internal restoring forces when pressure is removed, said cushion having two substantially parallel major surfaces whose dimensions are substantially larger than the dimensions of the minor surfaces of said cushion, one of said major surfaces forming a mammal-supporting surface so that when a mammal contacts the mammal-supporting surface, the material comprising the cushion will flow laterally in order substantially to equalize the supporting pressure applied over the entire area of support of said mammal by said cushion.

2. A cushion structure according to claim 1, in which the gel is a reaction product of a methyl polysiloxane containing silicon-bonded vinyl groups and a methyl polysiloxane containing SiH groups in which said reaction is catalyzed by platinum.

3. A cushion structure according to claim 1, in which a pair of flexible sheets are disposed upon said major surfaces and are substantially contiguous therewith, for protecting said gel against external contamination.

4. A cushion structure according to claim 3 wherein said sheets are resilient and permanently connected around said gel.

5. A cushion structure according to claim 3 including a thin member encircling said cushion;
   wherein one of said sheets is made of foamed plastic; and
   wherein said member has an adhesive on the side thereof remote from the foamed plastic and separably attached to the other sheet.

6. A cushion structure according to claim 1, in which said cushion consists essentially of an organsiloxane gel which is the reaction product of an intimate mixture consisting essentially of (1) an organosiloxane having a viscosity of from 100 to 10,000 cs. at 25° C. and being a copolymer consisting essentially of units of the formula $RViSiO$, $R_2SiO$, and $CH_3R_2SiO_{.5}$ where each R individually is selected from the group consisting of methyl and phenyl radicals and Vi represents a vinyl radical, at least 0.174 molar percent of the units in said copolymer being the said RViSiO units, (2) a liquid hydrogenosiloxane of the average formula $HRCH_3SiO(R_2SiO)_nSiCH_3RH$ where each R is as above defined and $n$ has an average value such that the viscosity of the hydrogenosiloxane is no more than 10,000 cs. at 25° C., no more than 25 molar percent of the total R radicals present in (1) and (2) being phenyl; the proportions of (1) and (2) being such that prior to reaction there is an average of from 1.4 to 1.8 gram atoms of the silicon-bonded H atoms in (2) per gram molecular weight of (1) and there being at least one RViSiO unit in (1) for every silicon-bonded H atom in (2), the molecular weight of (1) being calculated by the equation:

$$\log visc. = 1.00 + 0.0123 \, M^{.5}$$

where M is the molecular weight and "visc" is the viscosity of (1) in cs. at 25° C.; and
   a pair of flexible sheet means located on opposite sides of said cushion, said sheet means being engaged completely around said cushion.

7. A cushion structure according to claim 6, wherein said sheet means are made of polyurethane foam.

8. A cushion structure according to claim 6 wherein said cushion includes a sheet of flexible, porous material substantially parallel with and spaced from said opposite sides of said cushion; and
   wherein said cushion includes a dimethyl polysiloxane fluid having a viscosity of about 1,000 cs. at 25° C. and comprising approximately 25 percent by weight of said cushion.

9. A cushion structure according to claim 1, including resiliently flexible envelope means enclosing said cushion and snugly engaging same; and
   a thin resiliently flexible and extensible casing loosely and completely enclosing said envelope means and said cushion.

10. A cushion structure according to claim 1, in which the cushion consists essentially of an organosiloxane gel which is the reaction product of an intimate mixture consisting essentially of (1) an organosiloxane having a viscosity of from 100 to 10,000 cs. at 25° C. and being a copolymer consisting essentially of units of the formula $RViSiO$, $R_2SiO$ and $CH_3R_2SiO_{.5}$ where each R individually is selected from the group consisting of methyl and phenyl radicals and Vi represents a vinyl radical, at least 0.174 molar percent of the units in said copolymer being the said RViSiO units, (2) a liquid hydrogenosiloxane of the average formula $HRCH_3SiO(R_2SiO)_nSiCH_3RH$ where each R is as above defined and $n$ has an average value such that the viscosity of the hydrogenosiloxane is no more than 10,000 cs. at 25° C., no more than 25 molar percent of the total R radicals present in (1) and (2) being phenyl; the proportions of (1) and (2) being such that prior to reaction there is an average of from 1.4 to 1.8 gram atoms of the silicon-bonded H atoms in (2) per gram molecular weight of (1) and there being at least one RViSiO unit in (1) for every silicon-bonded H atom in (2), the molecular weight of (1) being calculated by the equation:

$$\log visc. = 1.00 + 0.0123 \, M^{.5}$$

where M is the molecular weight and "visc." is the viscosity of (1) in cs. at 25° C., and (3) a dimethyl polysiloxane fluid having a viscosity of about 1,000 cs. at 25° C. and comprising from approximately 10 percent to 50 percent by weight of said cushion.

11. A cushion structure for supporting the body of a mammal, comprising:

a one-piece, soft, resilient and nonfriable core means of jelly-like consistency, said core means being capable of relatively free flow in response to a weight placed thereon so that it can conform to the contour of a body supported thereon and can return to its original condition when the weight is removed, said cushion consisting essentially of an organosiloxane gel which is the reaction product of an intimate mixture consisting essentially of (1) an organosiloxane having a viscosity of from 100 to 10,000 cs. at 25° C. and being a copolymer consisting essentially of units of the formula $RViSiO$, $R_2SiO$ and $CH_3R_2SiO_{.5}$ where each R individually is selected from the group consisting of methyl and phenyl radical and Vi represents a vinyl radical, at least 0.174 molar percent of the units in said copolymer being the said $RViSiO$ units, (2) a liquid hydrogenosiloxane of the average formula $HRCH_3SiO(R_2SiO)_nSiCH_3RH$ where each R is as above defined and $n$ has an average value such that the viscosity of the hydrogenosiloxane is no more than 10,000 cs. at 25° C., no more than 25 molar percent of the total R radicals present in (1) and (2) being phenyl; the proportions of (1) and (2) being such that prior to reaction there is an average of from 1.4 to 1.8 gram atoms of the silicon-bonded H atoms in (2) per gram molecular weight of (1) and there being at least one $RViSiO$ unit in (1) for every silicon-bonded H atom in (2), the molecular weight of (1) being calculated by the equation:

$$\log \text{visc.} = 1.00 + 0.0123 \ M^{.5}$$

where M is the molecular weight and "visc." is the viscosity of (1) in cs. at 25° C.;

resiliently flexible envelope means enclosing said core means and snugly engaging same; and a thin rubber casing loosely and completely enclosing said envelope means and said core means.

12. A structure according to claim 1, including wall means defining a cavity having a contour similar to and larger than the external contour of a portion of the mammal body;

said cushion extending around and being adjacent to said wall means within said cavity for engagement with said portion, said cushion being of thickness to support said portion and exert a substantially uniform pressure against all engaged parts of said portion; and thin cover means arranged on said cushion for engagement with said portion and for protecting said cushion from external contamination without impeding the lateral flowability of said cushion.

13. A structure according to claim 12, wherein said cushion consists essentially of an organosiloxane gel which is the reaction product of an intimate mixture consisting essentially of (1) an organosiloxane having a viscosity of from 100 to 10,000 cs. at 25° C. and being a copolymer consisting essentially of units of the formula $$RViSiO, R_2SiO, \text{ and } CH_3R_2SiO_{.5}$$

where each R individually is selected from the group consisting of methyl and phenyl radicals and Vi represents a vinyl radical, at least 0.174 molar percent of the units in said copolymer being the said $RViSiO$ units, (2) a liquid hydrogenosiloxane of the average formula $$HRCH_3SiO(R_2SiO)_nSiCH_3RH$$

where each R is as above defined and $n$ has an average value such that the viscosity of the hydrogenosiloxane is no more than 10,000 cs. at 25° C., no more than 25 molar percent of the total R radicals present in (1) and (2) being phenyl; the proportions of (1) and (2) being such that prior to reaction there is an average of from 1.4 to 1.8 gram atoms of the silicon-bonded H atoms in (2) per gram molecular weight of (1) and there being at least one $RViSiO$ unit in (1) for every silicon-bonded H atom in (2), the molecular weight of (1) being calculated by the equation:

$$\log \text{visc.} = 1.00 + 0.0123 \ M^{.5}$$

where M is the molecular weight and "visc." is the viscosity of (1) in cs. at 25° C.

14. A cushion structure for engaging a portion of a mammal body, comprising:

thin flat web means comprised of flexible porous material impregnated with a gel and having gel layers disposed on the opposite sides of said web means to thereby form a multilayered, flat, web-form assembly in which said web means is sandwiched between said gel layers and is united thereto, said gel being an elastic, nonfriable, nonporous, semisolid gel, said gel having a hydrostatic property so that it is capable of easily flowing laterally under pressure, said gel being capable of returning toward its original shape as a result of its internal restoring force when pressure is removed.

15. A cushion structure according to claim 4 including sheet means removably covering the gel on both sides of said flexible, porous material.

16. A cushion structure for engaging a portion of a body, comprising:

a self-contained, resiliently flexible, relatively thin and semisolid core means having a soft, nonfriable and jelly-like consistency, said core means being hypoallergenic, stable over a selected temperature range and incapable of supporting the growth of algae and bacteria;

first and second flexible side sheets disposed upon opposite sides of, adjacent to and substantially parallel with said core means; and relatively thin, flexible wall means disposed between said side sheets and encircling said core means, one of said side sheets being releasably secured to said wall means by adhesive means on said wall means, whereby said core means is protected from external contamination.

References Cited

UNITED STATES PATENTS

| 1,366,027 | 1/1921  | Savastno  | 3—19X    |
| 2,477,588 | 8/1949  | Dumm      | 128—594  |
| 2,542,619 | 2/1951  | Bernhardt | 3—36     |
| 2,641,066 | 6/1953  | Filardo   | 128—594  |
| 3,020,260 | 2/1962  | Nelson    | 260—46.5 |
| 3,257,742 | 6/1966  | Feinberg  | 128—581X |
| 3,293,663 | 12/1966 | Cronin    | 3—36     |
| 3,308,491 | 3/1967  | Spence    | 5—348    |
| 3,309,714 | 3/1967  | Porten    | 3—20     |
| 3,366,975 | 2/1968  | Pangman   | 3—36     |

WILLIAM E. KAMM, Primary Examiner

R. L. FRINKS, Assistant Examiner

U.S. Cl. X.R.

5—384; 36—44, 71; 128—83, 149, 153, 594; 260—46.5